Nov. 24, 1931.  C. T. SIEBS ET AL  1,833,660
WELDING APPARATUS
Filed March 6, 1929
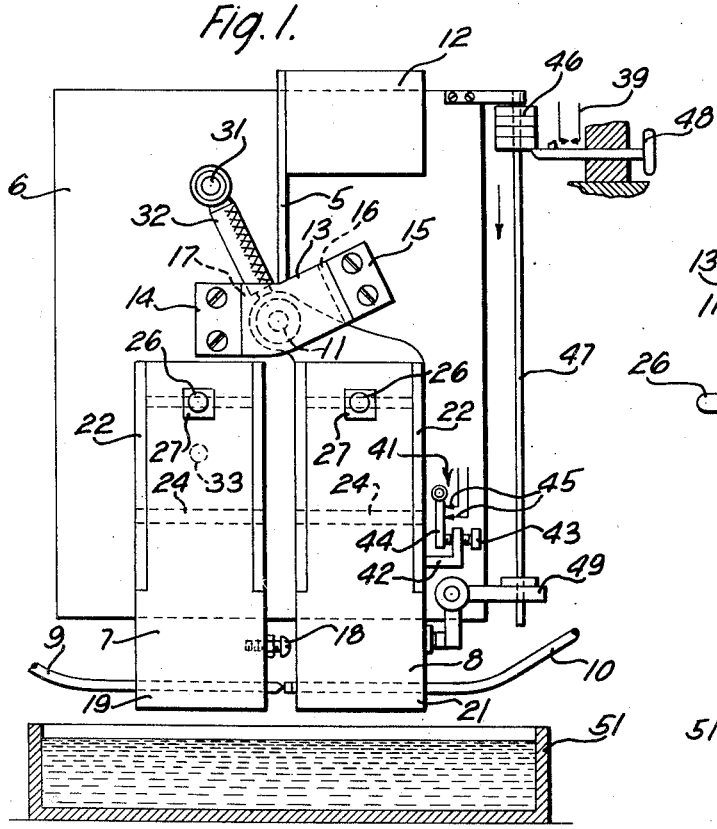
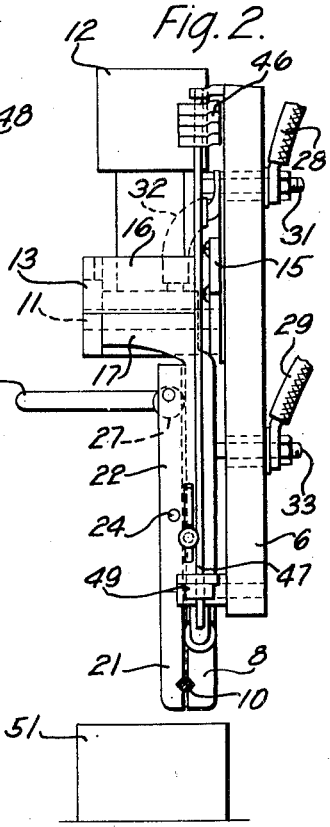
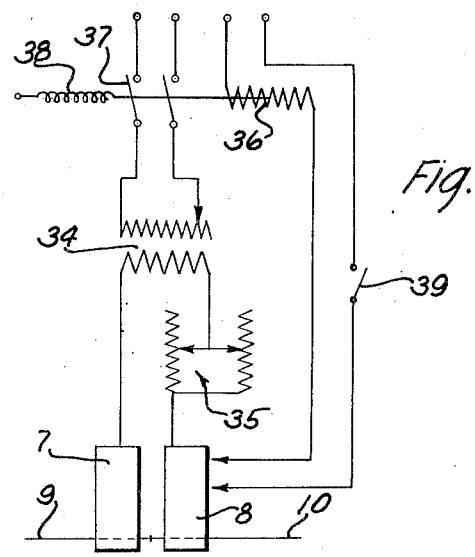
Inventors
Claude T. Siebs
Thomas A. Daniel
by Patented Nov. 24, 1931

1,833,660

UNITED STATES PATENT OFFICE

CLAUDE THEODORE SIEBS, OF CRANWOOD, NEW JERSEY, AND THOMAS ARCHIE DANIEL, OF MAYWOOD, ILLINOIS, ASSIGNORS TO WESTERN ELECTRIC COMPANY, INCORPORATED, OF NEW YORK, N. Y., A CORPORATION OF NEW YORK

WELDING APPARATUS

Original application filed July 31, 1926, Serial No. 126,150. Divided and this application filed March 6, 1929. Serial No. 344,762.

This invention relates to welding apparatus, and more particularly to apparatus for welding copper wires or rods, and is a division of our copending application Serial No. 126,150, filed July 31, 1926.

In the process of welding materials, such as copper wire, difficulty has been experienced in preventing the material from becoming overheated at and in the vicinity of the weld which results in a weakened physical structure of the metal due to a molecular change in the material known in copper practice as "burnt copper". This sometimes renders the material so brittle that difficulty is experienced in drawing the wire to fine sizes due to its tendency to break at the point where it was overheated.

An object of the present invention is to provide a simple and improved apparatus for producing a strong and ductile weld which obviates the difficulties heretofore experienced.

The invention contemplates the provision of an apparatus comprising means for initially supplying a large amount of heat to the parts to be welded to effect a quick temperature rise and means for controlling and limiting the temperature of the parts being welded in such manner as to complete the welding operation in the least possible time to avoid the deleterious effects which appear to accompany high temperatures of long duration. In accordance with one embodiment of the invention, the welding current is controlled by placing in the welding circuit an element having a high positive temperature coefficient which will allow a large initial flow of current while the element is cold to quickly bring the parts to the desired temperature, and as the temperature of the element increases due to the current, its resistance will increase and reduce the current to prevent excessive overhating. Any material which may have become molten during the heating is removed from the weld by a magnetic blow-out. When the parts have attained the proper temperature, the current is interrupted and after a definite delay to permit the parts to cool to a point slightly below the temperature at which they were welded a sharp percussive blow is communicated to the parts upsetting the material at the weld and producing a forging effect to improve the molecular structure of the material. During the time the parts are heated, they are immersed in a non-oxidizing agent such as water or manganese dioxide to reduce the danger of excessive overheating and to prevent oxidation of the parts.

It is believed that a better understanding of the invention may be had by reference to the following description taken in conjunction with the accompanying drawings, in which Fig. 1 is a front elevation of a welding apparatus embodying the features of the invention;

Fig. 2 is a side elevation of the apparatus shown in Fig. 1, and

Fig. 3 is a diagrammatic illustration of the welding circuit and the control circuit therefor.

Referring to the drawings in which the same reference numerals refer to similar parts in the several views, and more particularly to Figs. 1 and 2, a back plate 6 supports two jaws 7 and 8 between which wires or rods 9 and 10 to be welded are clamped and held in abutting relation. In order to insure a uniform contact between the wires in every welding operation, the ends of the wires are cut to a wedgeshape and the wedge-shaped edges are abutted at right angles as shown in Fig. 1. The jaw 7 is mounted in fixed relation to the base, while the jaw 8 is mounted on a pivot pin 11 for the purpose of allowing a relative movement between the jaws holding the wires 9 and 10 and enabling a weight 12, which is attached to the jaw 8 by a spring 5, to exert a pressure between their ends. In order to insure the rotation of the movable jaw in a definite plane, the pivot 11 is made long and is journaled at one end in the base 6 and at the other end in a U-shaped member comprising two flat portions 14 and 15 by means of which the member is fastened to the base, two upright portions 16 and 17 and a transverse portion 13 in which the other end of the pivot is journaled. The distance between the jaws is limited by an adjustable stop 18 which is insulated from the jaw. Each of the jaws 7 and 8 is provided with a movable clamping member 19 and 21, respectively, to hold the wires or rods to be welded, which members are pivoted in flanges 22—22 on the jaws by pins 24 passing through the flanges and the members and are operated by levers 26 which have at their base eccentrically pivoted cylinders 27. It is apparent that a downward movement of the lever 26 will cause the movable member of the jaw to pivot about the associated pin 24 and exert a pressure on the wire or rod held therebetween.

The apparatus comprises two circuits, a welding circuit and a control circuit therefor. The welding circuit, which includes a transformer 34 (Fig. 3), a control element 35, both of which are suitably mounted, and the welding jaws 7 and 8, is connected with the movable jaw 8 by a conductor 28 which is attached to a terminal 31, the opposite end of which is provided with a cable 32 leading directly to the movable jaw. The circuit is connected with the fixed jaw through a conductor 29 which is attached to a terminal 33, the opposite end of which connects directly with the fixed jaw. The control element 35 is located in one of the conductors between the secondary of the transformer and the welding jaws and consists of a plurality of nickel wires connected in parallel with each other. When this element is cold it will allow a large initial flow of current and as its temperature increases, due to the current, its resistance rapidly increases on account of the high positive temperature coefficient of the nickel wires, limiting the current the value and rate of decrease of which may be determined by the number and size of the nickel wires.

The control circuit (Fig. 3) is provided with a relay 36 suitably mounted which operates to close a switch 37 in the primary circuit of the transformer 34 against the action of a biasing spring 38 when the control circuit is closed, which closure may be accomplished by closing a hand operated switch 39. A second switch 41 (Fig. 1) is provided to open the control circuit and allow the biasing spring 38 to open the welding circuit when an arm 42 having an adjustable screw 43 moves a lever 44 out of engagement with terminals 45 of the control circuit after the jaw 8, to which the arm 42 is attached, has moved a predetermined distance toward the jaw 7.

The magnetic blow-out is constituted by the welding jaws and the material to be welded which form in effect a single turn of a coil. The inner sides of the jaws are made parallel in order to give the turn a sharp U-shaped bend in the vicinity of the weld. When a large current passes through this turn there is a tendency from the current carrying parts to be forced outwardly in a radial direction. This tendency may be illustrated by forming a wire into a rectangle and causing a large current to flow therethrough. The rectangle will tend to assume a circular shape due to the fact that the lines of magnetic force within the loop are much more concentrated than outside of the loop and the tendency for the lines to distribute themselves equally forces the sides of the loop radially. The heavy current which it is possible to use in this device due to the current control element, is sufficient to magnetically blow any material, which becomes molten before the major portion of the material which constitutes the weld reaches the welding temperature, from the joint.

In order to bring the ends of the parts to be welded firmly together when they have attained the proper temperature, an adjustable weight 46 is slidably mounted on a rod 47 and is held in its upper position by a release pin 48, which when moved to a position to release the weight will simultaneously close the switch 39 in the control circuit. The lower end of the rod 47 passes through an opening in an arm of a bell crank lever 49 and guides the weight to strike the arm of the lever to communicate a percussive force through the movable jaw to the parts being welded. By reason of the flexibility of the spring 5 the jaw 8 may move forward without overcoming the inertia of the weight 12.

During the entire welding process the parts being welded are submerged in a non-oxidizing liquid, such as water, contained in a vessel 51 which is raised until the portion of the jaws clamping the material is immersed to prevent overheating and oxidation of the parts being welded, some of which, such as copper, have a strong affinity for oxygen at high temperatures.

The operation of the apparatus will be described as applied to the welding of copper wires in a non-oxidizing agent of water: The wires to be welded are prepared and are placed in the jaws 7 and 8 as described above, and firmly clamped therein by a downward pressure on the levers 26—26 and a continuous pressure is exerted on the abutting ends of the wires by the weight 12 acting through the spring 5 to continuously urge the jaw 8 toward the jaw 7. The stop 18 has been previously set for a given size of wire and similarly the switch 41 has been adjusted to open the control circuit after the jaw 8 has moved a predetermined distance toward the stop on the fixed jaw 7. The vessel 51 is now raised until the wires are immersed in the liquid contained therein and the apparatus is then in position to begin the welding process which is done by drawing out the release pin 48 to release the weight 46 and simultaneously close the switch 39 to cause energization of relay 36 to close switch 37 in the primary circuit of the transformer 34. As soon as the primary welding circuit is closed there will be a large rush of current in the secondary circuit due to the low resistance of the nickel wires 35 when cold, and the abutting tips, which will attain the highest temperature due to the high resistance of the small contact area, will fuse. The fused metal will be removed by the magnetic blow-out leaving a small gap between the wires for the reason that the inertia of the weight 12 prevents the jaw from moving as quickly as the tips are melted. The heat of the gap is quite intense and would burn the metal were it not for the fact that the current has been reduced by the control element whose resistance has been greatly increased by the effect of the heat due to the current, on the element which has a high positive temperature coefficient. When the jaw 8 has moved toward the jaw 7 a predetermined distance the arm 42 will open the switch 41 and break the control circuit, deenergizing the relay 36, and allowing the biasing spring 38 to open the switch 37 in the primary circuit of the transformer 34. The copper is at this time just at the fusing temperature at which point it is very brittle and it is therefore allowed to cool until it reaches a slightly lower temperature at which time the weight 46 will have completed its travel down the rod, and will strike the bell crank lever 49 and communicate a percussive blow to the parts through the jaw 8, upsetting the material and producing the effect of forging the material to improve its molecular structure and completing the welding operation.

During the entire welding process the parts being welded are immersed in water to prevent overheating and oxidation. Although while the copper is being heated there may be a slight formation of copper oxide formed by the heated copper and the free oxygen in the water, on account of the solubility of copper oxide in molten copper it will be blown out by the magnetic blow-out with the molten copper.

A weld made in accordance with this invention and the material adjacent thereto is identical in molecular structure with the original material and may be drawn to the same sizes as the original material without exhibiting any weakness at or near the joint.

It will be understood that the embodiment of the invention herein described and illustrated is merely a convenient and useful form of the invention, which is capable of many other modifications without departing from the spirit and scope of the invention.

What is claimed is:

1. In a welding apparatus, a welding circuit, means connected to the circuit for holding the parts to be welded in abutting relation, a percussion device comprising a weight slidably mounted on a vertical rod, means to support the weight at the upper end of the rod, means to close the welding circuit when the weight is released by the supporting means, means for opening the welding circuit when the parts have become fused, and means for communicating the impact of the weight when it reaches the end of its travel to the parts being welded.

2. In a welding apparatus, means for clamping the parts to be welded and holding them in abutting relation, means for causing a current to flow through said parts to bring them to the welding temperature, and means to impart a percussive force to the parts after they have attained the welding temperature comprising a weight slidably mounted on a vertical rod and a bell crank lever at the base of the rod to communicate the force of the sliding weight to the parts to be welded through the clamping means.

3. In a welding apparatus, a welding circuit, means connected to the circuit for holding the parts to be welded in abutting relation, an element having a high positive temperature coefficient of resistance inserted in the circuit to decrease the welding current passing through the parts as their temperature increases, a magnetic blow out provided in the circuit to remove material from the parts which become molten before the major portion of the parts attains the welding temperature, and means to impart a percussive force to the parts when they have attained the proper temperature to bring them into close contact.

4. In a welding apparatus, means for abutting the ends of the parts to be welded, means for automatically supplying a large initial and smaller subsequent electric current to the parts, means for maintaining the parts in a spaced relation to permit the formation of an arc, means for extinguishing the arc, and impact means for bringing the parts into firm contact.

5. In a welding apparatus, means for abutting the ends of the parts to be welded, magnetic means for removing the abutting ends of the parts, means for holding the parts in spaced relation when the ends are removed to permit an arc to form, and a gravitationally actuated weight for bringing the parts into firm contact.

6. In a welding apparatus, a welding circuit, means connected to the circuit for holding the parts to be welded, a percussion device comprising a vertically slidable weight, means for closing the welding circuit, means for releasing the weight simultaneously with the operation of the closing means, and means for communicating the impact of the weight when it reaches the end of its travel to the parts being welded.

7. In a welding apparatus, means for supplying a welding current, a pair of jaws connected to the current supplying means for holding the parts to be welded in abutting relation, one of the jaws being rotatable relative to the other jaw, a vertically extending rod disposed adjacent to the rotatable jaw, a weight slidably mounted on the rod, and means for imparting a percussive blow from the weight to the rotatable jaw and the parts.

8. In a welding apparatus, means for supplying a welding current, a pair of jaws connected to the current supplying means for holding the parts to be welded in abutting relation, one of the jaws being rotatable with respect to the other, current conducting means inserted between the current supplying means and the jaws for decreasing the current to the parts as they become heated to a welding temperature, means for moving the rotatable jaw towards the other jaw as the parts melt, and control means connected to the rotatable jaw for disconnecting the current supplying means from the jaws when the rotatable jaw has moved towards the other jaw a predetermined distance.

9. In a welding apparatus, means for supplying a welding current, a pair of vertically disposed jaws connected to the current supplying means, means provided at the lower ends of the jaws for holding parts to be welded in an abutting horizontal position, means for rotating one of the jaws towards the other as the parts fuse, current conducting means inserted between the current supplying means and the jaws for decreasing the current supplied the parts as they become heated to welding temperature, means movable upwardly over the horizontal parts to submerge them in a cooling and non-oxidizing liquid, control means connected to the rotating jaw for disconnecting the welding current after said jaw has moved towards the other jaw a predetermined distance, and percussive means for imparting a blow to the rotating jaw when the parts are heated to a welding temperature.

In witness whereof, we hereunto subscribe our names this 19th day of February, A. D. 1929 and this 22nd day of February, A. D. 1929.

CLAUDE THEODORE SIEBS.
THOMAS ARCHIE DANIEL.